(12) United States Patent
Cornish

(10) Patent No.: US 8,911,187 B2
(45) Date of Patent: Dec. 16, 2014

(54) ADJUSTABLE RADIUS AND ANGLE COPING DEVICE

(76) Inventor: Gerald A. Cornish, Stillwater, MN (US)

( * ) Notice: Subject to any disclaimer, the term of this patent is extended or adjusted under 35 U.S.C. 154(b) by 678 days.

(21) Appl. No.: 13/285,387

(22) Filed: Oct. 31, 2011

(65) Prior Publication Data

US 2013/0108389 A1    May 2, 2013

(51) Int. Cl.
*B23C 3/12* (2006.01)
*B23C 3/02* (2006.01)
*B23C 3/00* (2006.01)

(52) U.S. Cl.
CPC .. *B23C 3/02* (2013.01); *B23C 3/007* (2013.01)
USPC ............ 409/200; 409/199; 409/201; 409/211

(58) Field of Classification Search
USPC ......... 409/138, 183, 189, 190, 191, 197, 199, 409/200, 201, 211, 216, 219
IPC .................................................. B23C 3/00,3/12
See application file for complete search history.

(56) References Cited

U.S. PATENT DOCUMENTS

| | | | | | |
|---|---|---|---|---|---|
| 1,427,609 | A | * | 8/1922 | McDonald | 175/202 |
| 1,675,374 | A | * | 7/1928 | Mueller et al. | 409/178 |
| 1,858,670 | A | * | 5/1932 | John | 409/199 |
| RE20,893 | E | * | 10/1938 | Bartholomew | 409/218 |
| 2,583,429 | A | * | 1/1952 | Johnson | 175/325.3 |
| 2,826,963 | A | * | 3/1958 | Rohlfs | 409/218 |
| 3,004,477 | A | * | 10/1961 | Nielsen et al. | 409/197 |
| 3,163,085 | A | * | 12/1964 | Wishing | 409/205 |
| 3,342,107 | A | * | 9/1967 | Margolien | 409/205 |
| 3,540,347 | A | * | 11/1970 | Randall | 409/200 |
| 3,577,828 | A | * | 5/1971 | Stickney | 409/199 |
| 4,266,457 | A | | 5/1981 | Balach | |
| 4,712,954 | A | * | 12/1987 | Campolito | 409/163 |
| 5,377,397 | A | * | 1/1995 | Yu et al. | 29/33 T |
| 6,435,783 | B1 | | 8/2002 | Rusch | |
| 7,284,406 | B2 | | 10/2007 | Kraus | |

FOREIGN PATENT DOCUMENTS

JP    60207709 A  * 10/1985
JP    07266117 A  * 10/1995

* cited by examiner

*Primary Examiner* — Daniel Howell
(74) *Attorney, Agent, or Firm* — Geiser Law, PLLC; Greg N. Geiser

(57) ABSTRACT

A coping apparatus that performs a cope cut of varying diameters and angles on varying sizes, diameters, and types of materials without having to change the diameter of the cutting tool. The apparatus comprises a table with a clamp, a cylindrical housing with an aperture pivotally mounted to the table, a motor, a tool, and a yoke assembly. The yoke assembly is rotatably received within the housing and comprises a upper disc with a channel, a lower disc with a channel, a upper arm, a lower arm, a connector, and a handle. The arms are received in the channels of the upper and lower discs and moveable in a direction radial to the rotation of the discs. The motor is mounted to the lower arm and turns a spindle and the tool. Upon manipulation of the handle, the tool is plunged into the material to make the cut.

8 Claims, 6 Drawing Sheets

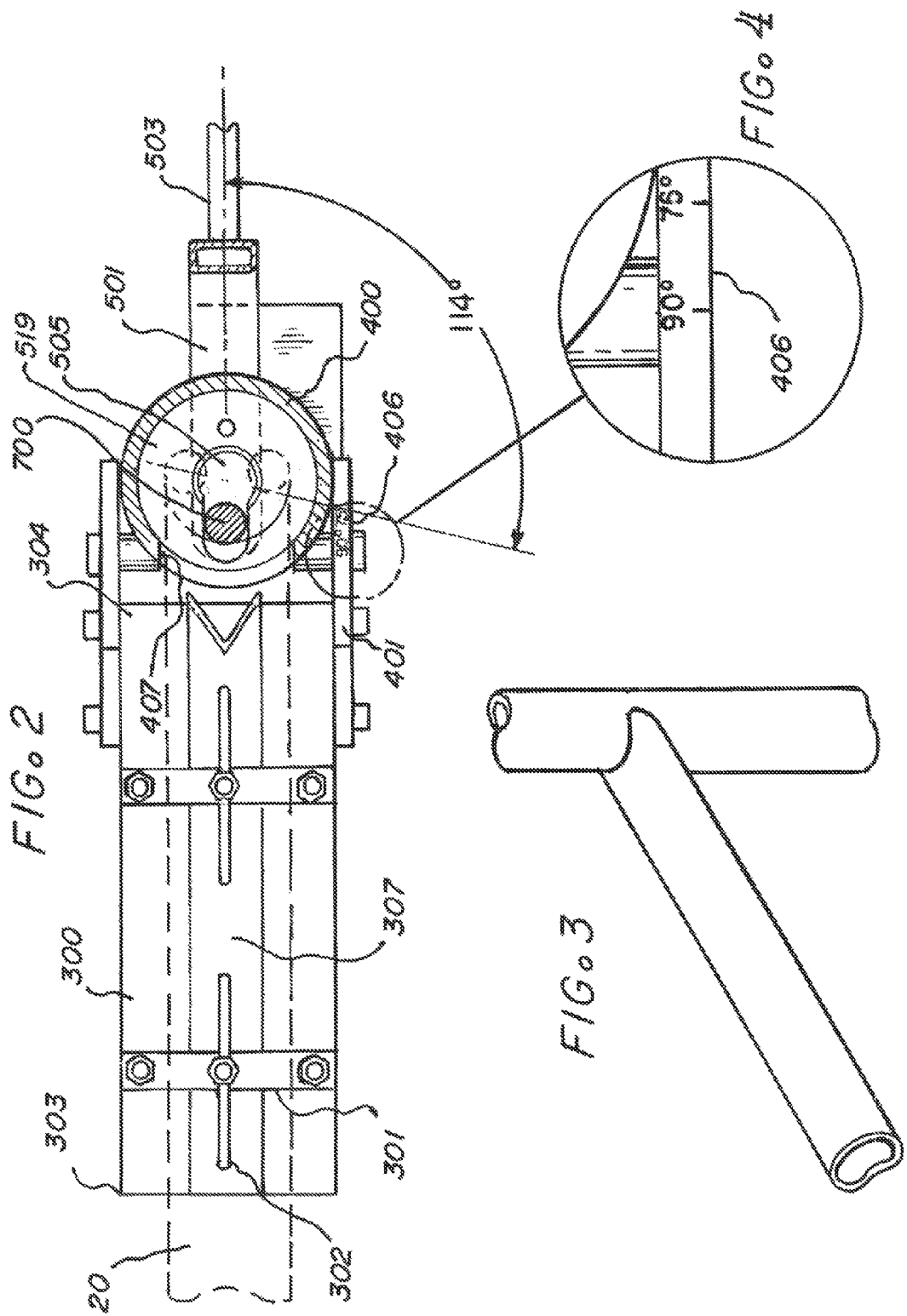

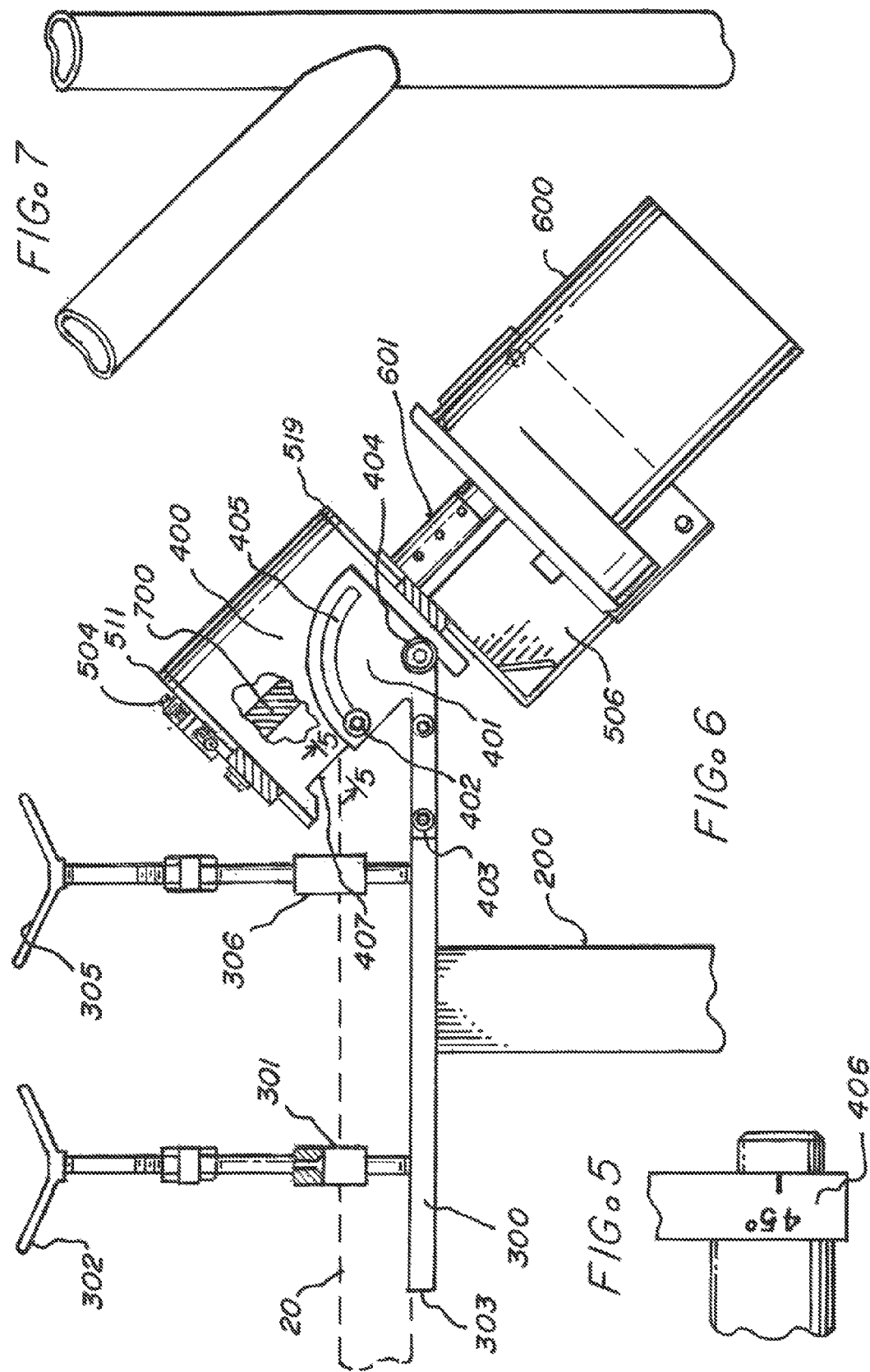

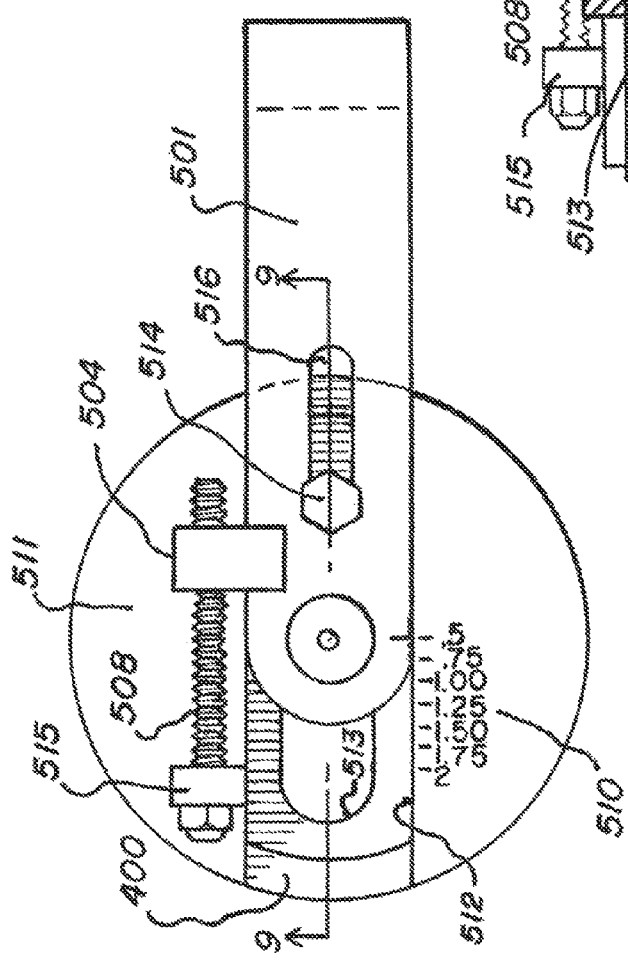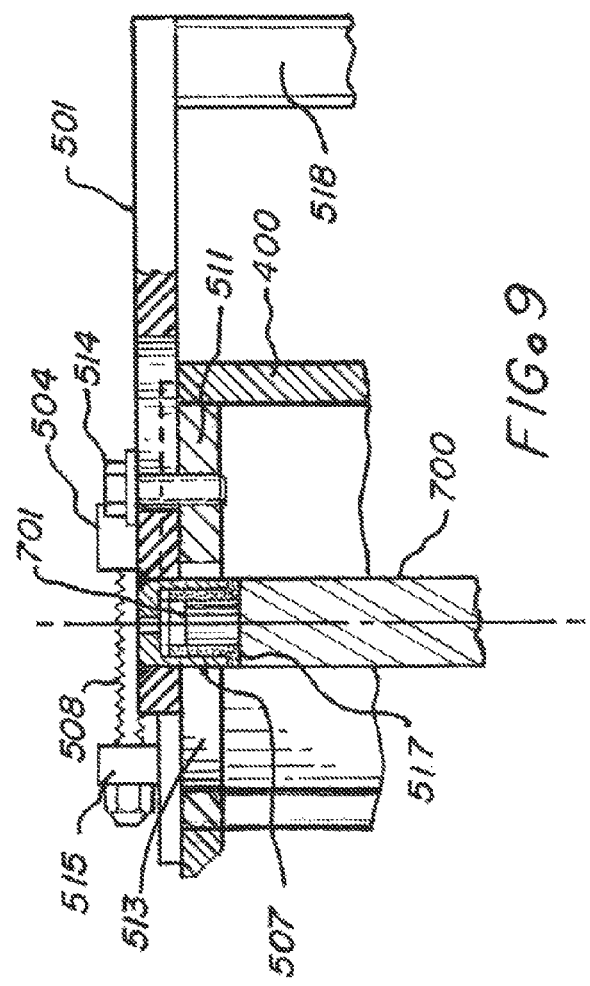

ADJUSTABLE RADIUS AND ANGLE COPING DEVICE

CROSS REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates to a device that allows a user to cope cut a workpiece of varying dimensions at various diameters and angles without having to change the diameter of the cutting tool.

BACKGROUND OF THE INVENTION

When adjoining two pieces of pipe, dowel, or rod it is desired that the joint is smooth and conforms to the diameter of the material joined. Typically, the best way to join these materials is through a cope cut. In a cope cut, the end wall of a first material is cut to match the diameter of the side wall of the second material. Often when joining metal materials, this joint is welded. A cope cut is commonly used when constructing railings, racks, and guardrails out of pipe and tubing.

Traditionally, this cope cut is made with a band saw or other similar tool. According to this method, a user will draw or trace the curve to be cut and carefully use the saw to remove the material along this curve. This is time consuming and often requires additional cuts or grinds to ensure a precise fit. More recently, this type of cut has been prepared using a milling type machine with the cut made by a tool sized to the diameter of the pipe to be fit. This requires several tools with varying diameters to accommodate the varying diameters of pipe. Additionally these machines are often very large and require a dedicated electrical connection. Therefore, a device is needed to perform a cope cut that cuts varying diameters of pipe without changing the tool, is portable, and uses standard household electrical current.

SUMMARY OF THE INVENTION

A coping apparatus is provided that performs a cope cut on varying sizes and types of materials. The apparatus is able to make this cope cut of varying diameters and angles on multiple sizes of materials without having to change the cutting tool. To perform this cope cut, the cutting tool of the apparatus is moveable in an arc and moveable at an angle relative to the workpiece. To facilitate the cutting of a cope of multiple diameters without having to change the cutting tool, the radius of the cutting arc of the apparatus is adjustable. To facilitate the cutting of this cope at multiple angles the coping apparatus is pivotally moveable at an angle relative to the workpiece, wherein the user adjusts the angle of the cutting tool to correspond to the angle of the desired cope cut.

The coping apparatus includes a base. The base includes holes to allow a user to affix the base to a floor or a substrate. The base can be fastened to an existing concrete floor by using anchored or fixed bolts. In addition, the base can be fastened to a metal plate. In this configuration, the apparatus is moved to the work location where the base is temporarily affixed to a plate using a bolt or other similar fastener.

A riser is centrally mounted perpendicular to the base. The riser is designed to raise a workpiece off of the floor or substrate to create a more comfortable and safer working height for the user. A table is mounted perpendicular to the riser and opposite the base. The table has a first end, a second end, and a clamp. The clamp is adjustable in a vertical direction relative to the table to tightly secure the workpiece from movement during use of the apparatus. The clamp may include a knob to allow the user to easily adjust the tension applied to the workpiece. The table first end receives the workpiece. The table second end allows for the pivotal attachment of a housing.

The housing is cylindrical shaped and provides protection for the user of the apparatus. The housing includes a workpiece aperture. The workpiece aperture is aligned with the table second end and sized to receive the workpiece. The housing is pivotally attached to second end using two brackets. The brackets are mirror images of each other and fixed to the second end using a first fastener and fixed to the housing a second fastener. The brackets include a arcuate aperture allowing the housing to pivot at an angle from a range of 45° to 135° relative to the table. A third fastener extends through the arcuate aperture and into the housing. The third fastener is adjustable and applies frictional tension to the connection of the bracket and the housing, whereby adjustment of the third fastener will allow the user to pivot and secure the angle of the housing relative to the table. The location of the third fastener within the arcuate aperture will indicate the angle of the housing relative to the table. The bracket includes a first indicator to show the user the angle of the housing relative to the table.

A yoke assembly is in communication with the housing and allows a tool to move in an arc and move in a direction radial to this arc, wherein the radius of the arc is adjustable. The yoke assembly includes a upper disc, a lower disc, a upper arm, a lower arm, a connector, and a handle. The upper disc is cylindrical and sized to be rotatably received in the top of the housing, wherein the disc will seat in the housing and rotate through an arc. The upper disc includes a first channel and a second adjustment block adjacent to the first channel. The first channel is sized to tightly receive the upper arm. The first channel provides lateral support for the upper arm as the tool is moved through the workpiece. A first channel aperture is located central to the first channel to allow the tool to be received in the yoke upper arm. The first channel aperture is aligned with a lower aperture and allows the tool space to move within the housing.

The upper arm is slidably received in the first channel. The upper arm includes a first adjustment block and a stop aperture. The first adjustment block is fixed to the upper arm and in alignment with the second adjustment block. A rod connects the first adjustment block and the second adjustment block. The radius of the cutting arc of the tool is adjusted by pulling apart or pushing together the first adjustment block and the second adjustment block. In the preferred embodiment of the present invention, a threaded rod is used to adjust the distance between the first adjustment block and the second adjustment block. A threaded rod is preferred for its strength and multiple radii of adjustment, but other forms of adjustment may be used, such as a notched rod and securing pin. A second indicator is placed on the upper disc. The second indicator displays the diameter of the radius the apparatus will cope. This indicator will correspond to the outer diameter of the material to be joined by the cope cut.

The upper arm includes the stop aperture. The stop aperture is sized to correspond to the maximum and minimum cutting radius of the apparatus. A stop is fixed to the upper disc in stop aperture. The stop ensures that the tool remains in the working radii of the apparatus.

The upper arm contains a recess aligned with the first channel aperture. The recess includes a bearing. The tool extends the height of the housing and has a upper end with a diameter corresponding to the diameter of the recess. The tool upper end is received in the recess. The receipt of the tool upper end in the recess allows the tool to move along with the radial movement of the yoke assembly. Additionally, the receipt of the tool upper end in the recess provides added support for the tool from shearing forces as the tool is advanced through the workpiece.

The lower arm is connected to the upper arm by the connector. The lower arm is seated in a second channel of the lower disc. The lower disc is cylindrical and sized to be rotatably received in the bottom of the housing, wherein the disc will seat in the housing and rotate through an arc. The second channel is centrally located on the lower disc and is sized to tightly receive the lower arm. The second channel includes the lower disc aperture. The second channel aperture is located central to the second channel to allow the tool entry to the interior of the housing. The second channel aperture is aligned with the channel aperture and allows the tool space to move within the housing as the radius of the cutting arc is adjusted.

The handle extends outward from the connector and opposite the housing allowing a user to rotate the yoke assembly within the housing and engage the tool in the workpiece. The yoke assembly moves the tool within an arc as the user manipulates the handle by pulling or pushing. The yoke assembly will swing through an arc of 114° from a position parallel to the table and a through a total arc of 228°.

A motor bracket is mounted to the lower arm seated in the second channel of the lower disc. A motor is connected to the motor bracket. The motor is fixed to the motor bracket using a fourth fastener. The motor turns a spindle. The tool is removably fixed to the spindle. The tool extends the height of the housing and is in communication with the upper arm. The connection of the motor to the motor bracket allows the motor to move with the yoke assembly as the yoke assembly is rotated through its arc and into the workpiece. The motor is an electric fixed speed motor that operates on a standard household current of 120 volts. The tool is composed of cutting teeth to remove material from the workpiece as the tool is engaged in the workpiece. The tool is preferably a modified milling cutter with a diameter of one inch (1 in.). The tool may be a left cutting mill or right cutting mill A tool aperture is located through the motor bracket and the lower arm. The tool aperture is aligned with the second channel aperture and allows the tool affixed to the spindle access to the interior of the housing. A lower stop aperture through the motor bracket and lower arm is sized to correspond to the cutting radius of the device. A second stop is received in the lower stop aperture and affixed to the lower disc. The second stop secures the lower arm and motor bracket to the disc and allows the motor and tool to rotate with the discs and move with the yoke. In the preferred embodiment of the present invention, the motor bracket is fixed to the lower arm using a removable fastener.

The workpiece is secured to the table using the clamp. The clamp is adjustable by tightening or loosening the knob. The table may contain a second clamp and second knob to aid in securing the workpiece. When two clamps are used, a clamp bridge may be used to further secure the workpiece to the table. Preferably the clamp bridge is constructed out of angle iron to accommodate pipe or tubing or varying diameters.

To make a 90° cope cut, a user will first secure the workpiece to the table using the clamp. The user will then use the first indicator to ensure that the housing is positioned perpendicular to the work piece at an angle of 90°. The user will then turn on the motor to begin the rotation of the tool. The user will then push or pull the handle in an arc moving the yoke assembly and engaging the tool in the workpiece.

To make an angular cope cut, a user will first secure the workpiece to the table using the clamp. The user will then loosen the third fastener and pivot the housing to the desired angle between a range of 45° to 135° relative to the table. The user will then tighten the third fastener and confirm the cutting angle using the first indicator. The user will then turn on the motor to begin the rotation of the tool. The user will then push or pull the handle in an arc moving the yoke assembly and engaging the tool in the workpiece.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein:

FIG. 2 is a top view of the apparatus with the upper disc 511 removed, according to the present invention;

FIG. 3 is a perspective view of joined pipe sections using a 90 degree cope cut, according to the present invention;

FIG. 4 is a close-up view of the alignment markings on the pivoting bracket of the apparatus, according to the present invention;

FIG. 5 is a sectional view of the apparatus as shown in FIG. 6 taken at the sectioning plane and in the direction indicated by section line 5-5, according to the present invention;

FIG. 6 is a side view of the apparatus with the housing pivoted to cut a 45 degree cope, according to the present invention;

FIG. 7 is a perspective view of joined pipe sections using a 45 degree cope cut, according to the present invention;

FIG. 8 is a top view of the housing and yoke, according to the present invention;

FIG. 9 is cross-sectional view of the housing in FIG. 8 taken at the sectioning plane and in the direction indicated by the section line 9-9, according to the present invention;

DETAILED DESCRIPTION OF THE INVENTION

Figure 1:
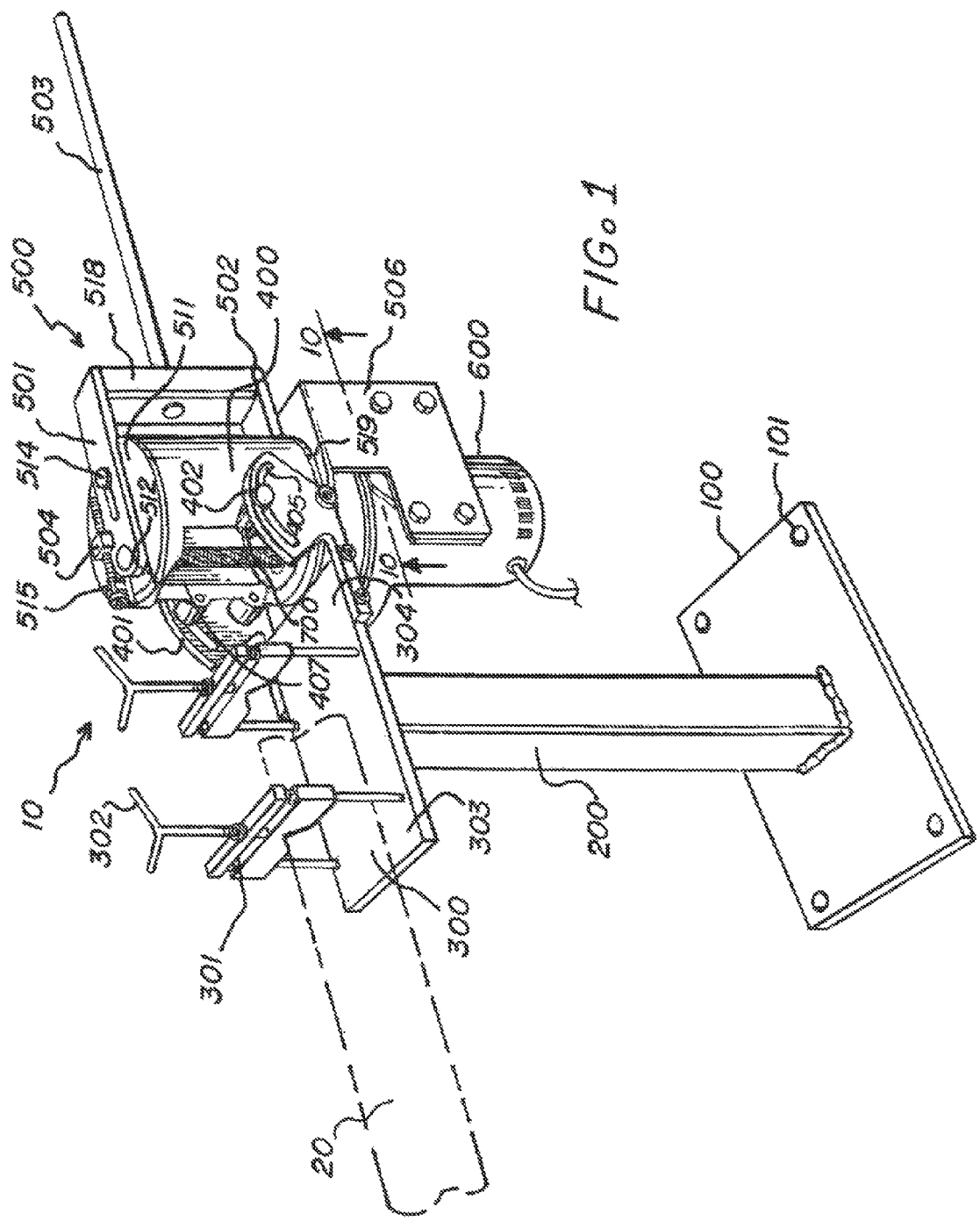
FIG. 1 is a perspective view of apparatus, according to the present invention.

Referring now to FIG. 1 there is shown an embodiment of the coping apparatus of the present invention, generally designated by the reference numeral 10. Coping apparatus 10 includes a base 100. Base 100 includes holes 101 to allow a user to affix the base to a floor or a substrate. The base 100 can be fastened to an existing concrete floor by using anchored or fixed bolts. In addition, the base 100 can be fastened to a metal plate. In this configuration, the apparatus 10 is moved to the work location where the base is temporarily affixed to a plate using a bolt or other similar fastener.

A riser 200 is centrally mounted perpendicular to the base 100. The riser 200 is designed to raise a workpiece 20 off of the floor or substrate to create a more comfortable and safer working height for the user. A table 300 is mounted to perpendicular to the riser 200 and opposite the base 100. The table 300 has a first end 303, second end 304, and a clamp 301. The clamp 301 is adjustable in the vertical direction relative to the table 300 to tightly secure the workpiece 20 from movement during use of the apparatus 10. The clamp 301 may include a knob 302 to allow the user to easily adjust the tension applied to the workpiece 20. The first end 303 receives the workpiece 20. The second end 304 allows for the pivotal attachment of a housing 400.

The housing 400 is cylindrical shaped and provides protection for the user of the apparatus 10. The housing 400 includes a workpiece aperture 407. The workpiece aperture 407 is aligned with the table second end 304 and sized to receive the workpiece 20. The housing 400 is pivotally attached to second end 304 using two brackets 401. Brackets 401 are mirror images of each other and fixed to the second end 304 using a first fastener 403 (seen in FIG. 6) and fixed to the housing a second fastener 404 (seen in FIG. 6). The bracket 401 includes a arcuate aperture 405 allowing housing 400 to pivot from a range of 45° to 135° relative to the table 300. A third fastener 402 extends through the arcuate aperture 405 and into the housing 400. The manipulation of the third fastener 402 allows the user to adjust the angle of the housing 400. A tightening of the third fastener 402 will secure the housing at the desired angle while a loosening of the fastener 402 will allow the user to pivot the housing 400 to the desired angle. The bracket 401 includes a first indicator 406 to show the user the angle of the housing 400, as shown in FIG. 4.

A yoke assembly 500 is in communication with the housing 400 and allows a tool 700 to move in an arc and move in a direction radial to this arc, wherein the radius of the arc is adjustable. The yoke assembly includes a upper disc 511, a lower disc 519, a upper arm 501, a lower arm 502, a connector 518, and a handle 503. The upper disc 511 is cylindrical and sized to be rotatably received in the top of the housing 400, wherein the upper disc 511 will seat in the housing 400 and rotate through an arc. The upper disc 511 includes a first channel 512 and a second adjustment block 515 adjacent to the first channel 512.

The upper arm 501 is slidably received in the first channel 512. The upper arm includes a first adjustment block 504 and a stop aperture 516 (shown in FIG. 8). The first adjustment block 504 is fixed to the upper arm 501 and in alignment with the second adjustment block 515. A rod 508 (as shown in FIG. 8) connects the first adjustment block 504 and the second adjustment block 515. Manipulation of the rod 508 will slidably move the upper arm 501 within the first channel 512 thereby moving the yoke assembly 500 and the tool 700 in a direction radial to the rotation of the upper disc 511 and the lower disc 519 within the housing 400. In the preferred embodiment of the present invention, the rod 508 is a threaded rod.

The lower arm 502 is connected to the upper arm by the connector 518. The lower arm 502 is seated in a second channel 520 (FIG. 10) of the lower disc 519. The lower disc 519 is cylindrical and sized to be rotatably received in the bottom of the housing 400, wherein the disc will seat in the housing 400 and rotate through an arc. A motor bracket 506 is fixed to the lower arm 502 and lower disc 519. The handle 503 extends outward from the connector 518 opposite the housing 400. The handle 503 allows the user to push or pull the yoke assembly 500 through an arc engaging the tool 700 in the workpiece 20.

A motor 600 is connected to the motor bracket 506. The connection of the motor 600 to the motor bracket 506 allows the motor 600 to move with the yoke assembly 500. The motor 600 is an electric fixed speed motor that operates on a standard household current of 120 volts. The tool 700 is rotated by a connection to the motor 600 and is composed of cutting teeth to remove material from the workpiece 20 as the tool 700 is engaged in the workpiece 20. The tool 700 extends the length of the housing 400. The tool 700 is preferably a modified milling cutter with a diameter of one inch (1 in.). The tool 700 may be a left cutting mill or right cutting mill.

Figure 1A:
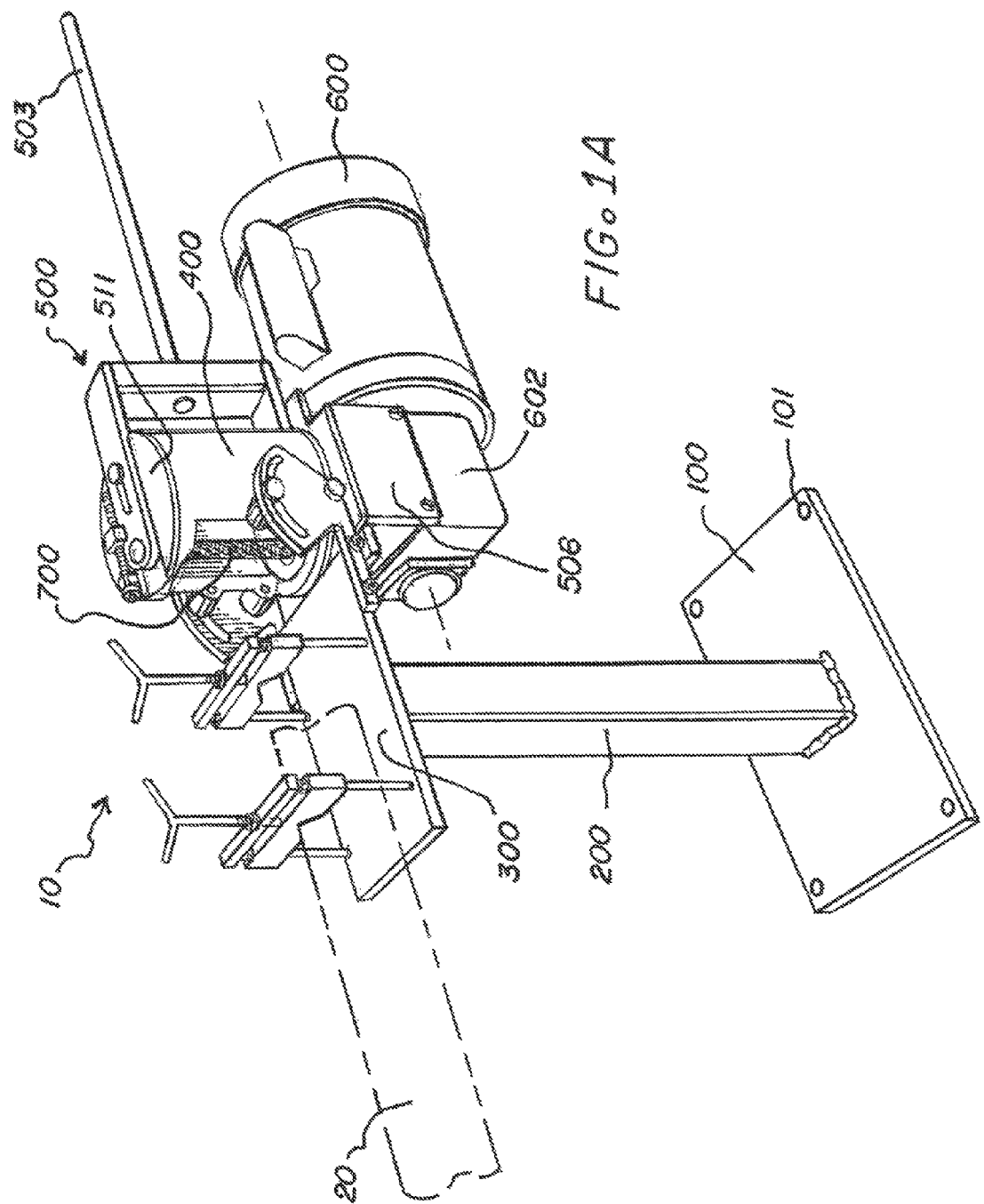
FIG. 1A is a perspective view of an alternate embodiment of the apparatus, according to the present invention.

Referring now to FIG. 1A, a perspective view of an alternate embodiment of the present invention, there is shown motor 600. The motor 600 is mounted to the motor bracket 506 and positioned parallel to the handle 503. To facilitate proper rotation of the tool 700, a gearbox 602 is required. The gearbox 602 is in communication with a spindle (not pictured) rotated by the motor 600 and translates this rotation to the tool 700 via intermeshed gears (not pictured). This pictured embodiment does not alter the working mechanics or functionality of the apparatus 10.

Referring now to FIG. 2, a top view of the apparatus with the upper disc 511 removed, there is shown the workpiece 20 engaged by the tool 700. Workpiece 20 is secured to the table 300 using the clamp 301. The clamp 301 is adjustable by tightening or loosening the knob 302. The table 300 may include two clamps 301 to ensure that the workpiece 20 is tightly secured to the table 300. When two clamps 301 are used, a clamp bridge 307 may be used to further secure the workpiece 20 to the table 300. Preferably the clamp bridge 307 is constructed out of angle iron to accommodate pipe or tubing or varying diameters.

The housing 400 is pivotally secured to the table second end 304 using the bracket 401. The bracket 401 includes a first indicator 406 (seen in FIG. 4) to show the angle of the housing 400 relative to the table 300 as the housing 400 is pivotally moved.

A tool aperture 505 is present in the lower disc 519. The tool aperture 505 is aligned with the tool 700 and shaped to accommodate the movement of the tool 700 within the housing 400. The yoke upper arm 501 is in communication with the handle 503. The handle 503 extends outward from the yoke assembly 500 (seen in FIG. 1) opposite the housing 400 and allows a user to rotate the yoke assembly 500 within the housing 400 and engage the tool 700 in the workpiece 20. The yoke assembly 500 moves the tool 700 within an arc as the user manipulates the handle 503 by pulling or pushing. The yoke assembly 500 will swing through an arc of 114° from a position parallel to the table 300 and a through a total arc of 228°.

To make a 90° cope cut, as shown in FIG. 3, a user will first secure the workpiece 20 to the table 300 using the clamp 301. The user will then use the first indicator 406 (seen in FIG. 4) to ensure that the housing 400 is positioned perpendicular to the workpiece 20 at an angle of 90°. The user will then turn on the motor 600 to begin the rotation of the tool 700. The user will then push or pull the handle 503 in an arc moving the yoke assembly 500 and engaging the tool 700 in the workpiece 20.

Referring now to FIG. 6, a side view of the apparatus with the housing 400 pivoted to cut a 45° cope as shown in FIG. 7. The table 300 is connected perpendicular to the riser 200. The first end 303, the second end 304, the clamp 301, a second clamp 306, the knob 302, and a second knob 305 are shown. The clamp 301 and the second clamp 306 secure the workpiece 20 to the table 300. The housing 400 is mounted to the table 300 by the bracket 401. The bracket 401 is mounted to the table 300 using the first fastener 403. In the preferred embodiment of the present invention, the first fastener 403 is a threaded bolt. The bracket 401 includes the arcuate aperture 405. The third fastener 402 extends through the arcuate aperture 405 and is secured to the housing 400. The third fastener 402 is adjustable and applies frictional tension to the connection of the bracket 401 and the housing 400, whereby adjustment of the third fastener 402 will allow the user to secure the angle of the housing 400 relative to the table 300. The location of the third fastener 402 within the arcuate aperture 405 will correspond to the angle of the housing 400 relative to the table 300 and be displayed on the first indicator 406, as shown in FIG. 5.

The motor bracket 506 is mounted to the lower arm 502 seated in the second channel 520 of the lower disc 519. The motor 600 is fixed to the motor bracket 506 using fourth fastener 509. The motor 600 turns a spindle 601. The tool 700 is removably affixed to the spindle 601. The connection of the motor 600 to the motor bracket 506 allows the motor 600 to move with the yoke assembly 500 as the yoke assembly 500 is rotated through its arc and into the workpiece 20.

To make a 45° cope cut, as shown in FIG. 7, a user will first secure the workpiece 20 to the table 300 using the clamp 301. The user will then use the first indicator 406 (seen in FIG. 4) to ensure that the housing 400 is positioned at a 45° angle relative to the workpiece 20. To pivot the housing 400, the user will loosen the third fastener 402 and pivot the housing 400 to the proper angle. The user will then turn on the motor 600 to begin the rotation of the tool 700. The user will then push or pull the handle 503 in an arc moving the yoke assembly 500 and engaging the tool 700 in the workpiece 20.

Referring now to FIG. 8, a top view of the housing 400 and yoke assembly 500, according to the present invention there is shown the housing 400 and the upper disc 511. The upper disc 511 is rotatably received within the housing 400. The upper disc 511 includes the first channel 512. The first channel 512 is sized to tightly receive the upper yoke arm 501. The first channel 512 provides lateral support for the upper yoke arm 501 as the tool 700 is moved through the workpiece 20. A first channel aperture 513 is located central to the first channel 512 to allow the tool 700 to be received in the yoke upper arm 501. The first channel aperture 513 is aligned with the second channel aperture 521 (seen in FIG. 2) and allows the tool 700 space to move.

The radius of the tool cutting arc is adjustable by moving the upper yoke arm 501 within the first channel 512. The first adjustment block 504 is fixed to the yoke upper arm 501 and the second adjustment block 515 is fixed to the upper disc 511. The radius of the cutting arc of the tool is adjusted by pulling apart or pushing together the first adjustment block 504 and the second adjustment block 515. In the preferred embodiment of the present invention, a threaded rod 508 is used to adjust the distance between the first adjustment block 504 and the second adjustment block 515. A threaded rod is preferred for its strength and multiple radii of adjustment, but other forms of adjustment may be used, such as a notched rod and securing pin. A second indicator 510 is placed on the upper disc 511. The second indicator 510 displays the diameter of the radius the apparatus will cope. This second indicator 510 will correspond to the outer diameter of the material to be joined by the cope cut.

The upper arm 501 includes the stop aperture 516. The stop aperture 516 is sized to correspond to the maximum and minimum cutting radius of the apparatus. The stop 514 is fixed to the upper disc 511 in the stop aperture 516. The stop 514 ensures the tool 700 remains in the working radii of the apparatus.

Referring now to FIG. 9, a cross-section view of the housing and yoke assembly along plane 9-9 in FIG. 8, there is shown the housing 400 and the upper disc 511. The upper disc 511 is rotatably received in the housing 400. The yoke upper arm 501 is fixed to the upper disc 511 by the connection of the first adjustment block 504 to the second adjustment block 515 using the threaded rod 508. Adjustment of the threaded rod 508 will adjust the radius of the arc of the cut. The stop 514 will prevent the tool 700 from exceeding its upper or lower cutting limits. The upper arm contains a recess 507 aligned with the first channel aperture 513. The recess 507 includes a bearing 517. The tool 700 has a upper end 701 with a diameter corresponding to the diameter of recess 507. The tool upper end 701 is received in the recess 507. The receipt of tool upper end 701 in the recess 507 allows the tool 700 to move along with the radial movement of the upper arm 501. Additionally, the receipt of the tool upper end 701 in the recess 507 provides added support for the tool from shearing forces as the tool 700 is advanced through the workpiece 20.

Figure 10:
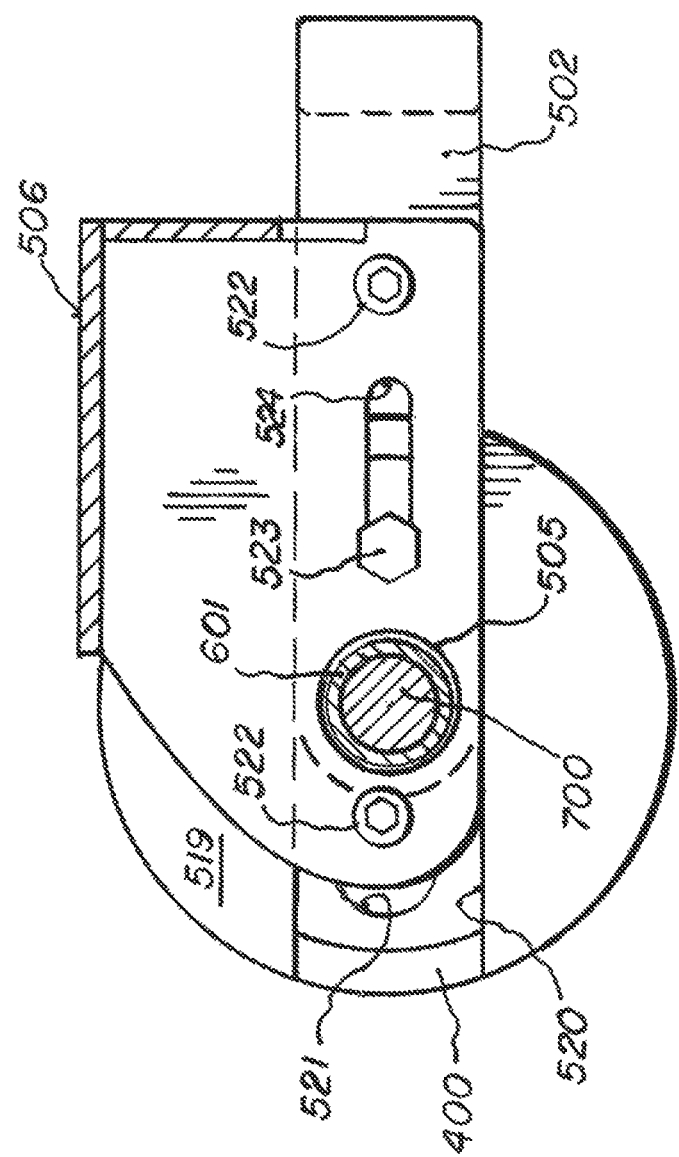
FIG. 10 is a bottom view of the device in FIG. 1 taken at the sectioning plane in the direction indicated by the section line 10-10, according to the present invention.

Referring now to FIG. 10, a bottom view of the device in FIG. 1 taken at the sectioning plane in the direction indicated by the section line 10-10, there is shown the housing 400 and the lower disc 519. The lower disc 519 is rotatably received within the housing 400 and includes the second channel 520. The second channel 520 is centrally located on the lower disc 519 and is sized to tightly receive the lower arm 502. The second channel 520 includes the second channel aperture 521. The second channel aperture 521 is located central to the second channel 520 to allow the tool 700 entry to the interior of the housing 400. The second channel aperture 521 is aligned with the first channel aperture 513 (seen in FIG. 8) and allows the tool 700 space to move within the housing 400.

The motor bracket 506 is fixed to the lower arm 502. A tool aperture 505 is located through the motor bracket 506 and lower arm 502. The tool aperture 505 is aligned with the second channel aperture 521 and allows the tool 700 affixed to the spindle 601 access to the interior of the housing 400. A lower stop aperture 524 through the motor bracket 506 and lower arm 502 is sized to correspond to the cutting radius of the device. A second stop 523 is received in the lower stop aperture 524 and affixed to the lower disc 519. The second stop 523 secures the lower arm 502 and motor bracket 506 to the disc 519 and allows the motor 600 and tool 700 to rotate with the discs and move with the yoke. In the preferred embodiment of the present invention, the motor bracket 506 is fixed to the lower arm 502 using a removable fastener 522.

The invention claimed is:

1. An apparatus for coping a workpiece, the apparatus comprising:
 (a) a table, the table comprising:
  (i) a first end;
  (ii) a second end; and
  (iii) a clamp adapted to securely hold the workpiece;
 (b) a housing, the housing being cylindrical and pivotally mounted to the second end, the housing comprising:
  (i) a aperture, the aperture aligned with the table second end;
 (c) a yoke assembly, the yoke assembly comprising:
  (i) a upper disc, the upper disc rotatably received in the housing and containing a first channel and a first channel aperture;

(ii) a lower disc, the lower disc rotatably received in the housing opposite the upper disc and containing a second channel and second channel aperture, the second channel aperture aligned with the first channel aperture;
(iii) a upper arm, the upper arm slidably received in the first channel and movable in a direction radial to the rotation of the upper and the lower disc, the upper arm containing a recess, the recess aligned with the first channel aperture;
(iv) a lower arm, the lower arm slidably received in the second channel and movable in a direction radial to the rotation of the upper and the lower disc, the lower arm containing a tool aperture, the tool aperture aligned with the second channel aperture;
(v) a connector, the connector attached to the upper arm and lower arm; and
(vi) a handle, the handle attached to the connector;
(d) a motor, the motor mounted to the lower arm and adapted to rotate a spindle; and
(e) a tool mounted to the spindle, the tool protruding through the tool aperture, second channel aperture, first channel aperture, and received in the recess, whereby the tool copes the workpiece as a user moves the yoke assembly through an arc using the handle.

2. An apparatus according to claim 1, wherein the motor operates on standard household current.

3. An apparatus according to claim 1, wherein the motor is mounted in line with the tool.

4. An apparatus according claim 1, wherein the motor is mounted perpendicular to the tool.

5. An apparatus for coping a workpiece, the apparatus comprising:
(a) a base;
(b) a riser, the riser being connected perpendicular to the base;
(c) a table, the table being connected to the riser opposite the base and parallel to the base, the table comprising:
(i) a first end;
(ii) a second end; and
(iii) a clamp adapted to securely hold the workpiece;
(d) a housing, the housing being cylindrical and pivotally mounted to the second end, the housing comprising:
(i) a aperture, the aperture aligned with the table second end;
(e) a yoke assembly, the yoke assembly comprising:
(i) a upper disc, the upper disc rotatably received in the housing and containing a first channel and a first channel aperture;
(ii) a lower disc, the lower disc rotatably received in the housing opposite the upper disc and containing a second channel and second channel aperture, the second channel aperture aligned with the first channel aperture;
(iii) a upper arm, the upper arm slidably received in the first channel and movable in a direction radial to the rotation of the upper and the lower disc, the upper arm containing a recess, the recess aligned with the first channel aperture;
(iv) a lower arm, the lower arm slidably received in the second channel and movable in a direction radial to the rotation of the upper and the lower disc, the lower arm containing a tool aperture, the tool aperture aligned with the second channel aperture;
(v) a connector, the connector attached to the upper arm and lower arm; and
(vi) a handle, the handle attached to the connector;
(f) a motor, the motor mounted to the lower arm and adapted to rotate a spindle; and
(g) a tool mounted to the spindle, the tool protruding through the tool aperture, second channel aperture, first channel aperture, and received in the recess, whereby the tool copes the workpiece as a user moves the yoke assembly through an arc using the handle.

6. An apparatus according to claim 5, wherein the motor operates on standard household current.

7. An apparatus according to claim 5, wherein the motor is mounted in line with the tool.

8. An apparatus according claim 5, wherein the motor is mounted perpendicular to the tool.

* * * * *